Aug. 30, 1960 A. MACOVSKI 2,951,117

HORIZONTAL DEFLECTION SYNCHRONIZING CIRCUIT FOR TELEVISION

Filed Feb. 24, 1956 2 Sheets-Sheet 1

INVENTOR.
Albert Macovski
BY
[signature]
ATTORNEY

INVENTOR.
Albert Macovski
BY
[signature]
ATTORNEY

United States Patent Office 2,951,117

Patented Aug. 30, 1960

2,951,117

HORIZONTAL DEFLECTION SYNCHRONIZING CIRCUIT FOR TELEVISION

Albert Macovski, Massapequa, N.Y., assignor to Radio Corporation of America, a corporation of Delaware Filed Feb. 24, 1956, Ser. No. 567,493

4 Claims. (Cl. 178—7.3)

The present invention relates to means for synchronizing the deflection of a cathode ray beam and more particularly to means for providing automatic frequency control of the horizontal scanning oscillator in a television receiver.

It is an object of this invention to provide an improved means for detecting the phase difference between horizontal synchronizing pulses and horizontal deflection pulses in a circuit that functions independently of the amplitude of either of the signals.

It is a still further object of this invention to provide an improved phase detector circuit for comparing a sawtooth wave and a pulse wave.

It is another object of this invention to provide an improved synchronizing circuit including singly or in combination a single pentode sync separator tube and an amplitude insensitive phase detector consisting of a single three electrode electron control device.

According to the invention a sawtooth wave is derived from horizontal sync pulses; the sawtooth wave is impressed across an electron control device which is keyed into conduction by horizontal deflection pulses. Since the sawtooth wave is symmetrical in waveform, a control voltage is therefrom developed which is indicative of the timing of the horizontal deflection pulses and therefore of the horizontal oscillator. The control voltage is thereupon utilized to control the frequency of the horizontal oscillator.

In one circuit utilizing the present invention, the sawtooth wave is derived from a pentode tube to which is applied the composite television signal. The sawtooth is developed in the output circuit of the pentode responsive to the horizontal synchronizing pulses; negative vertical sync pulses are obtained from the screen grid of the pentode. The vertical sync pulses are thereupon integrated and utilized to control the vertical oscillator.

Other and incidental objects of this invention will become apparent upon a reading of the following specification and a study of the drawings, where:

Figure 1:
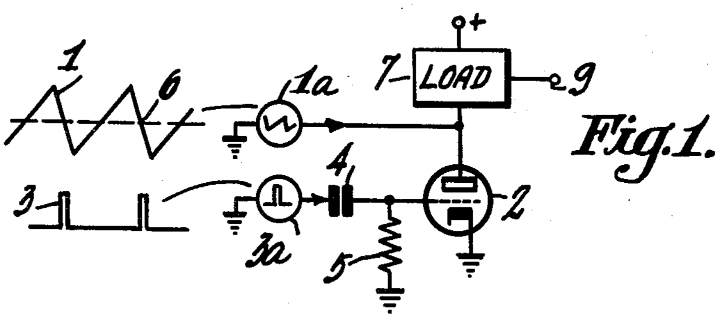
Figure 1 is a circuit diagram of one form of the present invention.

The schematic diagram of Figure 1 illustrates one circuit which, according to the present invention, develops a control signal dependent upon the timing of a sawtooth wave as compared to a train of pulses. The sawtooth wave 1 from generator 1a is applied to the anode of the electron tube 2. Also, a train of pulses 3 from generator 3a is applied to the control grid of the electron tube 2. The pulse train 3 is applied to the control grid by way of the condenser 4 and resistor 5 which serve to function as a grid leak circuit so that the tube 2 conducts only during the pulses.

The timing of the sawtooth wave 1 is such that each pulse in the pulse train 3 occurs during the corresponding retrace interval of the sawtooth wave 1. The electron tube 2 will actually conduct only when keyed by a pulse from the pulse train 3. The point given the numeral 6 on the sawtooth wave 1 of Figure 1 illustrates a typical zero point. Since the sawtooth wave 1 is symmetrical, the average anode voltage will be independent of the sawtooth wave amplitude for a given phase relation between the sawtooth wave 1 and the pulse train 3. If the timing of the retrace interval of sawtooth wave 1 should change relative to the timing of each of the pulses of the pulse train 3, this change will cause a change in the average anode voltage during the conduction of the electron tube 2. This change in average anode voltage is caused by the anode current pulses through the output load 7. A voltage will thereupon be developed at the output terminal 9 which is indicative of the timing of the sawtooth wave 1 and the pulse train 3 and will be of such a nature as to have "sense." For example a predetermined voltage is developed at terminal 9 when the zero point of the retrace interval of sawtooth wave 1 is in proper time coincidence with the corresponding pulse of the pulse train 3, then a shift in one direction in the timing of the zero point relative to the corresponding pulse will produce a more positive voltage at terminal 9 and a shift in the other direction will produce a less positive voltage. The magnitude of the error voltage, that is, the amplitude of the voltage change in a more positive or less positive direction is determined within limits by the phase difference between the timing of the sawtooth wave 1 and the pulse train 3.

Figure 2:
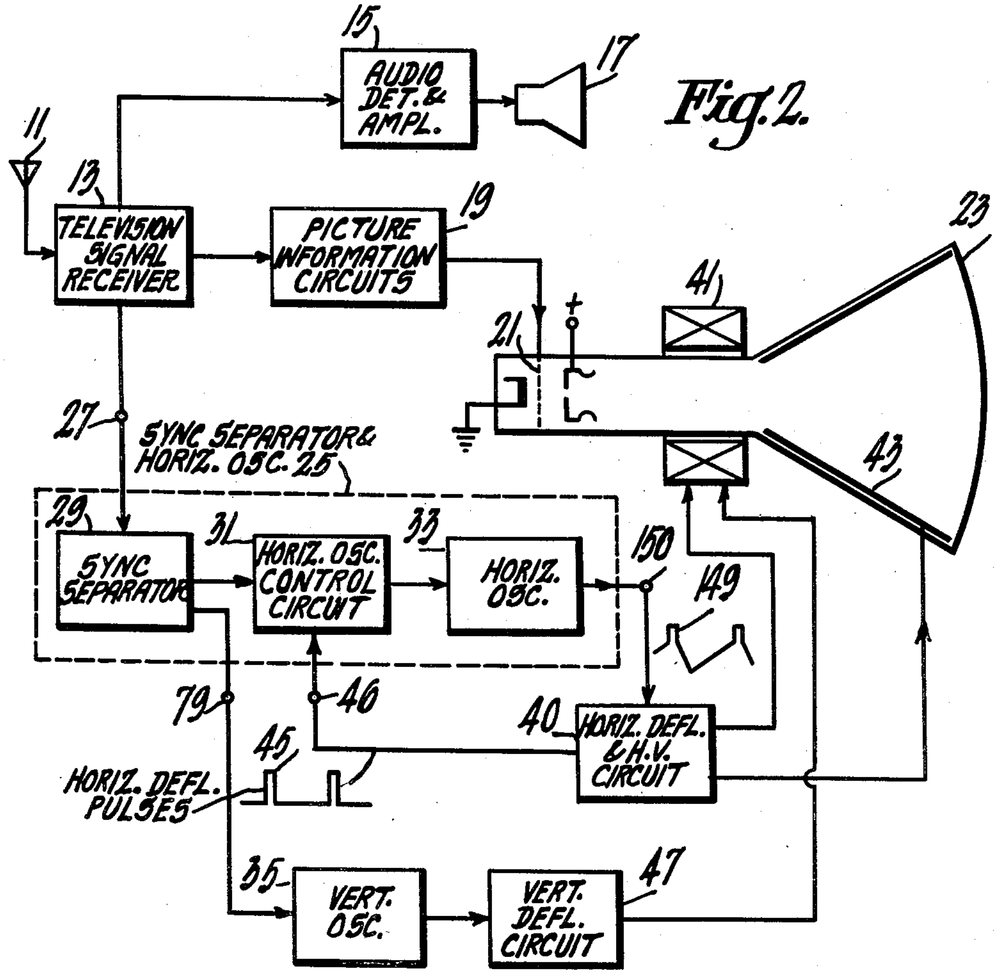
Figure 2 is a block diagram of a television receiver.

In the block diagram of the television receiver of Figure 2 which illustrates one application of the present invention, the incoming signal from the broadcast transmitter is received at the antenna 11 and applied to the television signal receiver 13. The television signal receiver 13 includes detection means such as a superheterodyne receiving circuit. The output of the signal receiver is a television signal which includes picture information, deflection synchronizing signals including horizontal and vertical synchronizing and blanking signals, and a sound-modulated carrier.

The sound-modulated carrier is transmitted on a frequency-modulated carrier 4½ mcs. removed from the picture carrier. Utilizing, for example, an intercarrier type circuit in the audio detector and amplifier 15, the sound information is demodulated and amplified and applied therefrom to the loud speaker 17.

The picture information in the composite television signal is amplified and provided with, for example, D.C. restoration in the picture information circuits and applied to the control electrode 21 of the kinescope 23.

The composite television signal is also applied to the sync separator and horizontal oscillator circuit 25 by way of the terminal 27. The sync separator and horizontal oscillator circuit 25 is contained within the dash line bearing the numeral 25 and includes a sync separator 29, the horizontal oscillator control circuit 31 and the horizontal oscillator 33. The sync separator 29 separates the horizontal and vertical sync pulses and applies the horizontal sync pulses to the horizontal oscillator control circuit 31 and vertical sync pulses to the vertical oscillator 35.

The horizontal oscillator 33, responsive to frequency control by the horizontal oscillator control circuit 31, drives the horizontal deflection and high voltage circuit 40 which produces a horizontal deflection signal which is applied to the yokes 41, a high voltage which is applied to the ultor 43 and horizontal deflection pulses 45 which are applied to the horizontal oscillator control circuit 31 by way of terminal 46.

The vertical oscillator 35, responsive to the frequency control by the vertical sync pulses provided by the sync separator 29, drives the vertical deflection circuit 47 which provides vertical deflection signals for the yokes 41.

The present invention includes an improved type of horizontal oscillator control circuit wherein a sawtooth wave derived from the horizontal sync pulses is compared with the horizontal deflection pulses provided by the horizontal deflection and high voltage circuit 40. One embodiment of the improved sync separator and horizontal oscillator 25 of the present invention is shown in Figure 3.

Figure 3:
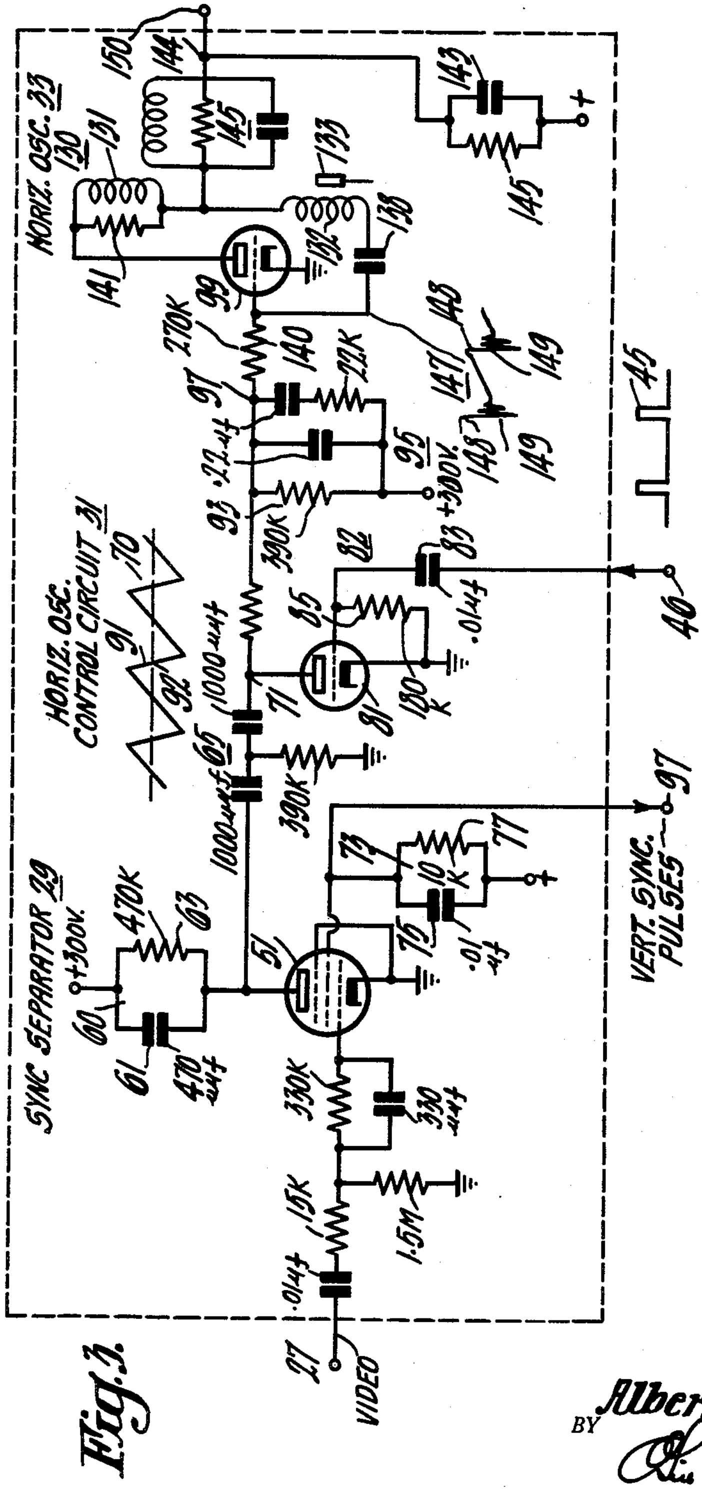
Figure 3 is a schematic diagram of the form of the present invention shown in Figure 1 as employed in the television receiver of Figure 1.

In the sync separator and horizontal oscillator 25 of Figure 3, the television signal is applied to the control grid of the pentode 51 of the sync separator 29. By proper design of the time constant of the anode circuit 60 which consists of the condenser 61 in parallel with the resistor 63, the horizontal sync pulses are substantially separated from the composite television signal and utilized to form a sawtooth wave 70. The sawtooth wave is generated by the discharge action by the pentode 51. During the interval between horizontal sync pulses, the condenser 61 is charged from the operating potential supply and is discharged through the pentode 51 upon occurrence of a horizontal sync pulse to produce the desired sawtooth waveform at the anode of the pentode 51. The high pass filter 65 is utilized to further remove any vertical sync information from the sawtooth wave. The high pass filter 65 thereupon applies the sawtooth wave 70 to the terminal 71. This sawtooth wave 70 has a wave shape derived from the horizontal sync pulses with the short time period of the sawtooth wave corresponding to the retrace interval between scanning lines.

A screen grid circuit 73 consisting of the condenser 75 and the resistor 77 is coupled to the screen grid of the pentode 51. By proper design of the time constant of the screen grid circuit 73, the vertical synchronizing pulses are separated from the composite television signal and applied to the terminal 79 from which terminal they are thereupon applied to the vertical oscillator 35.

The horizontal oscillator control circuit 31 whose schematic diagram is included in Figure 3, includes an improved type of amplitude insensitive phase detector circuit which consists of a single triode, namely, the triode 81. The sawtooth 70 is developed between the anode of triode 81 and ground by way of terminal 71. The horizontal deflection pulses 45 are applied to the control grid of triode 81 by way of terminal 46 and through a grid leak circuit 82 including the condenser 83 and the resistor 85. The grid leak circuit 82 allows the triode 81 to conduct only during the horizontal deflection pulses 45 and when operating normally, the triode 81 will conduct only when the retrace portion of the sawtooth wave 70 is passing through zero. One retrace portion of the sawtooth wave 70 is given the numeral 91 with the zero point assigned the numeral 92. Since the sawtooth wave 70 is symmetrical, the average anode voltage is independent of the sawtooth wave amplitude. If the timing of the horizontal deflection pulses 45, which are indicative of the phase of the horizontal oscillator 33 should vary so as to cause oscillator drift during operation, this variation will cause changes in anode voltage during conduction of the triode which in turn changes the anode current and the voltage across the resistor 93. This voltage across the resistor 93 is filtered by the circuit 95 and applied to the frequency control circuit of the horizontal oscillator 33.

The horizontal oscillator 33 is of a type shown in detail in Figure 4 of Patent 2,698,903 of S. I. Tourshou. While complete details of the operation are to be found in the Tourshou patent, the following is a summary of some aspects of this operation which will provide a more complete understanding of the operation of the horizontal oscillator circuit 33 of Figure 3 of the present application.

At the output terminal 97 of the horizontal oscillator control circuit 31, the voltage is produced which is indicative of the timing between the sawtooth wave 70 and the train of pulses 45. This control signal is thereupon applied to the grid of the triode 99 of the horizontal oscillator 33 which is a blocking oscillator.

The blocking oscillator includes a coil 130 including an anode section coil 131 and a grid section coil 132 connected to function as an autotransformer and tunable by use of a moveable core of powdered iron 133. The anode section coil 131 is coupled to the anode of tube 99. The grid section coil is coupled to the grid of tube 99 by way of condenser 138 which, in conjunction with resistor 140 and the resistance contained in the filter 95, forms a grid leak circuit. Resistor 141 shunts the anode section coil 131 of the coil 130 and serves as a damping resistor. The horizontal oscillator functions as a blocking oscillator to charge condenser 143, which discharges through resistor 145, to develop a wave at the point 144 which is suitable for driving the horizontal deflection and high voltage circuit 40.

The resonant circuit 145 develops a sine wave which combines with a sawtooth wave developed by the blocking oscillator action across condenser 143 and the wave developed by the blocking oscillator at the control grid of tube 99. The sine wave affects the voltage applied by the grid section of the coil 132 to the control grid of the tube 99 whereby the grid voltage approaches the firing point of the blocking oscillator more abruptly near the normal firing point or bias level at which the oscillator will begin to repeat its cycle of operation. This prevents an inadvertent rise in the grid voltage caused by either noise, a change in tube circuit conditions or from other causes thereby increasing the stability of the oscillator.

The waveform 147 is the oscillation which appears at the control grid of tube 99 during the operation of the horizontal oscillator 33. The waveform 147 includes a positive peak 148 and an abrupt negative excursion 149. The oscillator is blocked between one negative excursion 149 and the next peak 148; however, some other oscillations may also be present as shown in waveform 147.

The potential derived by the horizontal oscillator control circuit 31 from the comparison of the sawtooth wave 70 and the pulses 45, and integrated by the filter circuit 95, is used to bias the tube 99 to control the rate of discharge of the grid leak condenser 138 and therefore the frequency of the horizontal oscillator 33.

The process of frequency control is described as follows: When the oscillator frequency is fast with respect to the desired frequency, the anode current of tube 81 of the horizontal oscillator control circuit 31, when conducting, will be at or near its minimum value. The terminal 97 will present a potential, depending on the timing between the sawtooth wave 91 and the pulses 45. When the oscillator frequency is fast, this potential is less positive thereby slowing down the rate of discharge of the grid leak condenser 138. When the oscillator frequency is lower than desired, the tube 81 will draw less current when conducting; the potential at terminal 97 will become more positive and the frequency of the horizontal oscillator 33 will increase. As a result of the filtering action of the filter 95 on the current pulses drawn to the anode of tube 81 thereby providing a continuous bias to the tube 99 of the horizontal oscillator 33, the blocking oscillator will stabilize in frequency and timing at the frequency and timing prescribed by the horizontal synchronizing pulses.

Using a sync separator, for example, horizontal oscillator control circuit 31 and a horizontal oscillator 33 according to the circuit parameters listed on the circuit of Figure 3, a pull in range of two bars on each side of center was obtained, or in other words the control circuit was operable to bring the horizontal oscillator into synchronism with the received synchronizing pulses when the free running frequency of the oscillator was as much as 120 cycles away from the frequency of the synchronizing pulses.

Having described the invention, what is claimed is:

1. In a television receiver adapted to receive a composite television signal including recurrent horizontal synchronizing pulses and including a horizontal deflection oscillator of controllable frequency and phase including means for developing recurrent flyback pulses; a phase detector circuit comprising means for developing a sawtooth wave from said horizontal synchronizing pulses, an amplifying device including a common electrode, an output electrode and a third electrode for controlling the current between said common and output electrodes, means to impress said sawtooth wave between said common and output electrodes, means to apply said recurrent flyback pulses from said oscillator between said third and common electrodes in a polarity and of such amplitude to cause current flow between said common and output electrodes so that said flow varies in accordance with the instantaneous amplitude of said sawtooth wave at the time of said recurrent output signal and relative to the phase relation between the sawtooth wave and said recurrent output signal, means for developing a reference voltage indicative of the magnitude of said current flow, said developing means being coupled between said common and output electrodes and responsive to said current flow, and means to apply said reference voltage to said oscillator to control the frequency and phase thereof.

2. In a television receiver adapted to receive composite television signals including recurrent horizontal synchronizing pulses, the combination of synchronizing signal separating means for separating said horizontal synchronizing pulses from a composite television signal, means coupled to said synchronizing signal separator means for developing a sawtooth wave having a frequency corresponding to the rate of recurrence of said horizontal synchronizing pulses, a horizontal frequency oscillator including an output circuit for developing a train of flyback pulses, said oscillator having a terminal for receiving a control voltage and being responsive to said control voltage to control the relative phase of said train of flyback pulses, an electron tube having a cathode, an anode and a control electrode, means to apply said sawtooth wave between said anode and cathode, means to apply said train of flyback pulses to said control electrode in a polarity and of such amplitude to cause electron flow to said anode during the interval of each of the pulses of said train of pulses, integrating circuit means responsive to the flow of electrons to said anode to develop an automatic frequency control voltage, and means for applying said automatic frequency control voltage to said terminal for receiving a control voltage of said horizontal frequency oscillator.

3. In a television receiver adapted to receive composite television signals including recurrent horizontal synchronizing pulses, the combination of means to develop a sawtooth wave from said horizontal synchronizing pulses, a horizontal deflection oscillator including means for developing a recurrent output signal, an electron tube having a cathode, a control electrode and an anode, means to impress said sawtooth wave between said cathode and anode, means to apply said recurrent output signal from said oscillator to said control electrode in a polarity and of such amplitude to increase the flow of electrons from said cathode to said anode so that said flow varies in accordance with the instantaneous amplitude of said sawtooth wave at the time of said recurrent output signal and relative to the phase relation between the sawtooth wave and said recurrent output signal, means for developing a reference voltage indicative of the magnitude of said flow of electrons, said developing means being responsive to said flow of electrons, and means to use said reference voltage to control the frequency and timing of said oscillator.

4. In a television receiver adapted to receive composite television signals including recurrent horizontal synchronizing pulses, the combination of means to develop a sawtooth wave from said horizontal synchronizing pulses, a horizontal deflection oscillator including means for developing recurrent output pulses of substantially the same frequency as said sawtooth wave, an electron tube having a cathode, a control electrode and an anode, means to impress said sawtooth wave between said cathode and anode, means to apply said recurrent output pulses from said oscillator means between said control electrode and cathode, said output pulses being of a polarity and magnitude to cause current to flow between said control electrode and cathode and thereby condition said tube for current flow between said cathode and anode so that said flow varies in accordance with the instantaneous amplitude of said sawtooth wave at the time of said recurrent output signal and relative to the phase relation between the sawtooth wave and said recurrent output signal, means for developing a reference voltage indicative of the phase relation between said sawtooth wave and said recurrent output signal, said developing means being responsive to said current flow between said cathode and anode, and means to apply said reference voltage to said oscillator to adjust the phase of said output pulses in a direction to maintain a predetermined phase relation between said output pulses and said sawtooth wave.

References Cited in the file of this patent

UNITED STATES PATENTS

| | | |
|---|---|---|
| 2,632,049 | Druz | Mar. 17, 1953 |
| 2,645,717 | Massman | July 14, 1953 |
| 2,739,182 | Wissel et al. | Mar. 20, 1956 |
| 2,764,686 | Luther | Sept. 25, 1956 |